United States Patent [19]

Brunner et al.

[11] Patent Number: 5,131,041
[45] Date of Patent: Jul. 14, 1992

[54] FAULT TOLERANT INTERCONNECTION NETWORKS

[75] Inventors: Beat Brunner, Lausanne, Switzerland; Vijay P. Kumar, Freehold, N.J.

[73] Assignee: AT&T Bell Laboratories, Murray Hill, N.J.

[21] Appl. No.: 444,581

[22] Filed: Nov. 30, 1989

[51] Int. Cl.⁵ .................................................. H04J 3/02
[52] U.S. Cl. ........................................ 370/58.2; 370/65.5
[58] Field of Search ............... 370/60, 65.5, 63, 58.1, 370/58.2

[56] References Cited

U.S. PATENT DOCUMENTS

| | | | |
|---|---|---|---|
| 4,509,169 | 4/1985 | Renner | 370/63 |
| 4,516,238 | 5/1985 | Huang et al. | 370/60 |
| 4,667,320 | 5/1987 | Onno et al. | 370/65.5 |
| 4,890,281 | 12/1989 | Balboni et al. | 370/60 |

OTHER PUBLICATIONS

Ashjaee, M. J., "Totally Self-Checking Circuits for Separate Codes", a PhD dissertation at University of Iowa, Jul. 1976.
Kumar, V. P. and Reddy, S. M., "Augmented Shuffle--Exchange Multistage Interconnection Networks," Computer, Jun. 1987, pp. 30-40.
Kumar, V. P., "On Highly Reliable High-Performance Multistage Interconnection Networks, " a PhD dissertation at University of Iowa, 1985.
Golan, P., "Design of Totally Self Checking Checker for 1-out-of-3 code," IEEE Transactions on Computers, vol. C-33, No. 3, Mar. 1984, p. 285.
Carter and Schneider, "Designs of Dynamically Checked Computers," IFIP68, vol. 2, Edinburgh, Scotland, Aug. 1968, pp. 878-883.

Primary Examiner—Benedict V. Safourek
Assistant Examiner—Min Jung
Attorney, Agent, or Firm—H. T. Brendzel

[57] ABSTRACT

A multi-stage, alternate routing switching network is enhanced with a switch architecture that is able to detect and mask all single faults. The switch employs a controller that develops dual rail control signals. In one embodiment, the controller is made up of two controllers that receive the same inputs but generate complementary outputs. The complementary outputs form the dual rail signals that control the multiplexers that are interposed between the inputs and the outputs of the switch. The dual rail control of the signal routing within the switch allow for effective detection of all signal faults in the signal routing means. Inclusion of totally self checking circuits at the switch outputs as well as inputs enables users to readily isolate a fault and identify its source.

21 Claims, 6 Drawing Sheets

FIG. 3
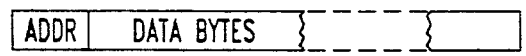
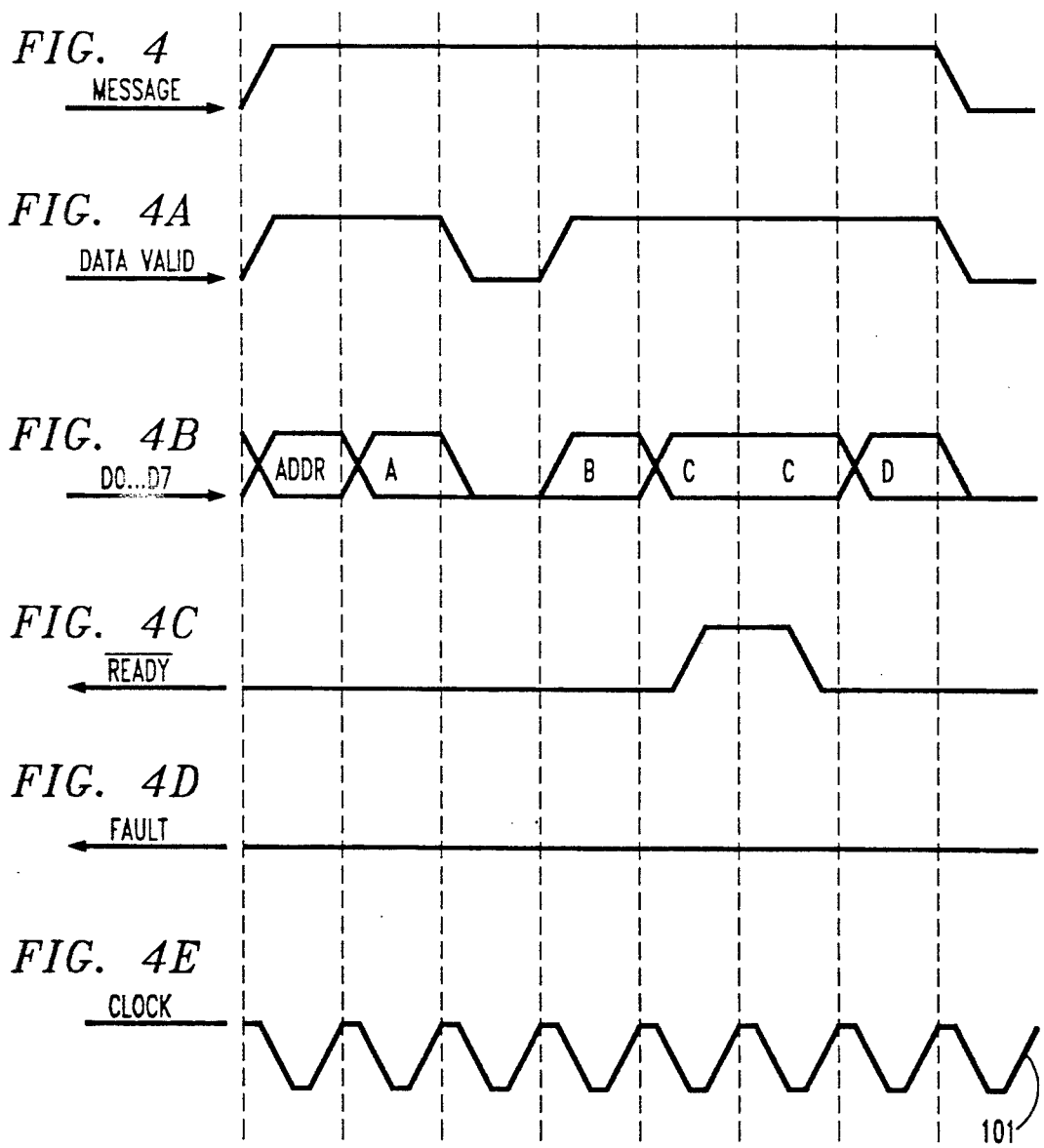

| | B2 | B1 | B0 |
|---|---|---|---|
| t1 | – | – | – |
| | – | – | – |
| t2 | B3 | B2 | B1 |
| | – | – | B0 |
| t3 | B4 | B3 | B1 |
| | – | B2 | B0 |
| t4 | B5 | B3 | B1 |
| | B4 | B2 | – |
| t5 | B5 | B3 | B2 |
| | B4 | – | – |
| t6 | B5 | B4 | B3 |
| | – | – | – |
| t7 | B6 | B5 | B4 |
| | – | – | – |

FAULT TOLERANT INTERCONNECTION NETWORKS

BACKGROUND OF THE INVENTION

This invention relates to switching networks and more particularly to multipath switching networks that include means for overcoming faults.

Multistage interconnection networks have long been studied for use in telephone switching and multiprocessor systems. Since the early 70's, several such networks have been proposed to meet the communication needs of multiprocessor systems in a cost-effective manner. They are typically designed for N-inputs and N-outputs, where N is a power of an integer n, such as 2, and contain $\log_n N$ stages. The switches in adjacent stages are interconnected to permit the establishment of a path from any input of the network to any output of the network. These multistage networks have many properties that make them attractive for switching systems. One such property is their relatively low rate of increase in complexity and cost as the number of inputs and outputs increases. Generally their size and cost increase on the order of $N \log_n N$, as compared to crossbar switches where size and cost increase on the order of $N^2$. Another such property is the ability to provide up to N simultaneous connections through path lengths on the order of $\log_n N$. Still another property is the ability to employ simple distributed algorithms that make a routing controller unnecessary. One example of such a network is found in U.S. Pat. No. 4,516,238 issued to Huang et al. on May 7, 1985.

Multistage networks with log N stages also have two other properties which are not desirable; i.e., only one path exists from any input to any output, and distinct input/output paths have common links. These properties lead to two disadvantages. First, an input/output connection may be blocked by a previously established connection even if the inputs (sources) and the outputs (destinations) of the network are distinct. Second, the failure of even a single link or switch disables several input/output connections. The former leads to poor performance in a random connections environment, and the latter leads to a lack of fault tolerance and concomitant low reliability.

The performance degradation due to blocking and the decrease in reliability due to lack of fault tolerance become increasingly serious with the size of the network, because the number of paths passing through a given link increase linearly with N. Fortunately, it turns out that the addition of a few links per stage results in a substantial increase in the number of multiple paths between every network input and network output pair, and that ameliorates the disadvantages. Such networks are called multiple path multistage networks. In setting up a connection, multiple path multistage interconnection networks allow an alternate path to be chosen where conflicts arise from a blocking situation or when faults develop in the network. This provides for both better performance and higher reliability than that which is offered by the unique path multistage networks.

To better understand the principles of the invention described below, it may be useful to have a particular multiple path multistage network in mind. To that end, the following describes the augmented shuffle exchange network described in "Augmented Shuffle-Exchange Multistage Interconnection Networks", V. P. Kumar and S. M. Reddy, *Computer*, Jun. 1987, pp. 30-40. FIG. 6 of the article is reproduced here as FIG. 1 to aid in explaining the network. The augmented shuffle exchange network of FIG. 1 is still a blocking network, but the probability of blocking is reduced because of the multiple paths that are included. This feature is illustrated in the description below.

FIG. 1 presents a five stage network with 16 inputs and outputs. The stage numbers are shown in the bottom of the drawing. The switches in stages 1 and 2 each have two inputs at the left of the switch, one input at the top of the switch, two outputs at the right of the switch, and one output at the bottom of the switch. The switches at stage 3 of FIG. 1 only have two inputs and two outputs, each. When the inputs at the top of the switches and the outputs at the bottom of the switches are not considered (in stages 2 and 3), the three center stages of FIG. 1 simply depict a portion of a conventional shuffle exchange network. The connections of the top inputs in the switches of stages 2 and 3 with the bottom outputs of the switches in those stages form the additional, alternate, routing paths for the network. For example, if inputs 11 and 13 of switch 10 wish to be connected to network outputs 0 and 4 respectively, switch 10 can be set to connect input 11 to output 12, switch 20 can be set to connect input 12 to output 22, switch 30 can be set to connect input 22 to output 32, and switch 40 can be set to apply input 32 to output 0 of the network. Connecting input 13 to output 15 in switch 10 would not be useful because, as shown by FIG. 1, the link connected to output 15 cannot reach output 4 of the network. Therefore, input 13 must be connected within switch 10 to the alternate routing output of the switch; to wit, output 14. Output 14 of switch 10 is connected to the top input of switch 16. From output 14, the signal of input 13 may then be routed to switch 26 through switch 16, then to switch 36, to switch 46, and finally to output 4 of the network. Thus, the alternate routing inputs and outputs of the switches in the stages 1 and 2 of FIG. 1 together the links that connect them provide for an alternate path in the network.

It may be noted that FIG. 1 also includes stage 0 and stage 4 which are somewhat different in kind from the center three stages. Specifically, stage 0 comprises two-input/one-output multiplexer switches, and stage 4 comprises one-input/two-outputs multiplexer stages. In stage 0, each switch i derives its input signals from inputs i and $$\frac{N}{2} + i$$

of the network. Thus, switch i where i=0 (i.e., switch 50) derives its inputs from the network's input 0 and input 8, switch i where i=2 (i.e., switch 51) derives its inputs from the network's input 2 and input 10, etc. In stage 4, the switches are arranged in groups of four. The first and third switches in the top group connect to the network's output 0, and output 1, and the second and fourth switches connect to the network's output 2 and output 3. The next group of four switches connect to the network's outputs 4-7, etc.

The reliability and performance improvement obtained from a multipath network depend on how effectively the available alternate paths are used by the routing algorithm. One can use a back-tracking routing algorithm that exhaustively searches for an available fault-free path. However, implementation of backtracking is relatively expensive in terms of hardware, and back-tracking can take an inordinately long time to set up connections. Non back-tracking algorithms, therefore, are much preferred. One such algorithm is described in the aforementioned Kumar et al. paper. The algorithm assumes that each switch is able to ascertain whether it is faulty in any one of its three outputs. If a faulty condition is discovered, the switch is able to communicate that information, through its inputs, to the switches to which it is connected.

The overall algorithm results from each switch performing a specified routing task. Each switch in the network has buffers at each of its three inputs. The buffers store incoming packet signals and in instances of contention, when alternate routing is not possible (such as when all three inputs have incoming pockets), the buffers store the packets so that no information is lost. Of course, the packet signals considered here are the conventional packet signals which contain a header section and a data section. The header section contains different types of information, including the source address, the destination address, parity, etc. In operation, each switch looks at the destination addresses of the packets that it receives for routing at each of the three inputs. The packets are then switched to the appropriate outputs (the two outputs on the right of the switch) based on the destination addresses of the packets in the buffers. If more than one packet is desirous of connection to a particular switch output, or if access to one of the required switch outputs is blocked by a fault in the switch, then the packet is switched to the auxiliary output of the switch (bottom output).

It may be noted that in stage 0, at the very input of the network, if access to one of the switches is blocked due to a fault, the packet at that switch is routed to another switch. It may also be noted that stage 3 switches, such as switch 36, do not have a top input and a bottom output shown. For purposes of the routing task, it may be assumed that those switches are identical to the switches in stages 1 and 2 but the bottom output tied to a faulty state.

The FIG. 1 network is described above in connection with packet switching. The same network is also described in connection with circuit switching in a PhD dissertation by V. P. Kumar, titled "On Highly Reliable High-Performance Multistage Interconnection Networks", University of Iowa, 1985. The switches described in the thesis have a modular design: there is an "input module" at each input of the switch and an "output module" at each output of the switch, for a total of six separate modules. Each input module is connected to each output module through a set of nine linking buses. Each module in the thesis switch is a state machine that implements the protocol functions in setting up a connection. The design presented employs an encoding arrangement for both the control and the data signals. The encoding employs the class of M-out-of-N codes for the control signals, for which TSC (Totally Self-Checking) checkers exist. For the data signals, the Berger code (which is also a TSC checkable code) is employed. The combinational logic portion of the modules is implemented using a single fault secure PLA (Programmable Logic Array). Each input module has a 1-to-3 demultiplexer for switching to each of the three outputs, and each output modules, in turn, has a 3-to-1 multiplexer which enables it to select from each of the three inputs. The control signals for the multiplexers and demultiplexers are generated by the control PLA. Finally, each module has an arrangement of TSC checkers that detect errors in the data lines as well as in the control paths.

The switch design described above is quite good, but it does have a number of problems. Specifically, any "line stuck-at" faults from the control PLA to the multiplexers and demultiplexers can cause corruption and/or misrouting of data. These failures can go undetected. Also, an error detected by a TSC checker in the data lines at an input module cannot be definitively pinpointed. It can be due to a fault in the preceding stage or in the current stage, and there is no way of distinguishing between these two possibilities. In short, the problems combine to make the switch not fully effective for the purpose of fault-tolerant operation.

SUMMARY OF THE INVENTION

These deficiencies are overcome and a fully fault-tolerant operation is attained in a new switch architecture that is able to detect and mask all single faults. The switch employs a controller that develops dual rail control signals. In one embodiment, the controller is made up of two controllers that receive the same inputs but generate complementary outputs. The complementary outputs form the dual rail signals that control the multiplexers which are interposed between the inputs and the outputs of the switch. The dual rail controls of the signal routing within the switch allow for effective detection of all single faults in the signal routing means. Inclusion of totally self checking circuits at the switch outputs as well as inputs enables users to readily isolate a fault and identify its source.

BRIEF DESCRIPTION OF THE DRAWING

FIG. 3 shows the packet format to be used in the network;

FIGS. 4 through 4E illustrates one useful protocol to be employed in connection with the FIG. 2 switches;

DETAILED DESCRIPTION

Figure 1:
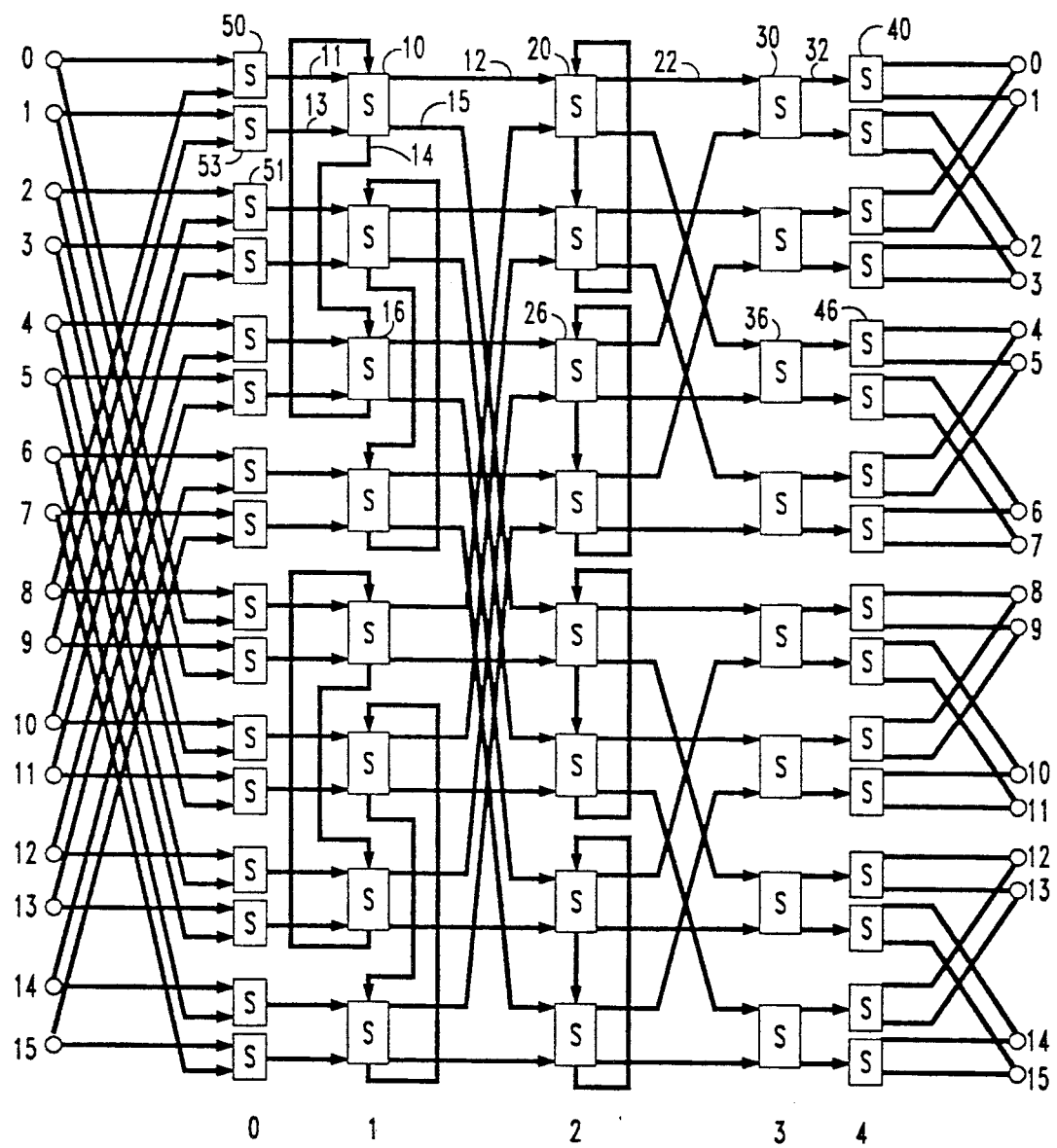
FIG. 1 presents a block diagram of an augmented shuffle exchange network employing switches that have an alternate path input and an alternate path output.
Figure 2:
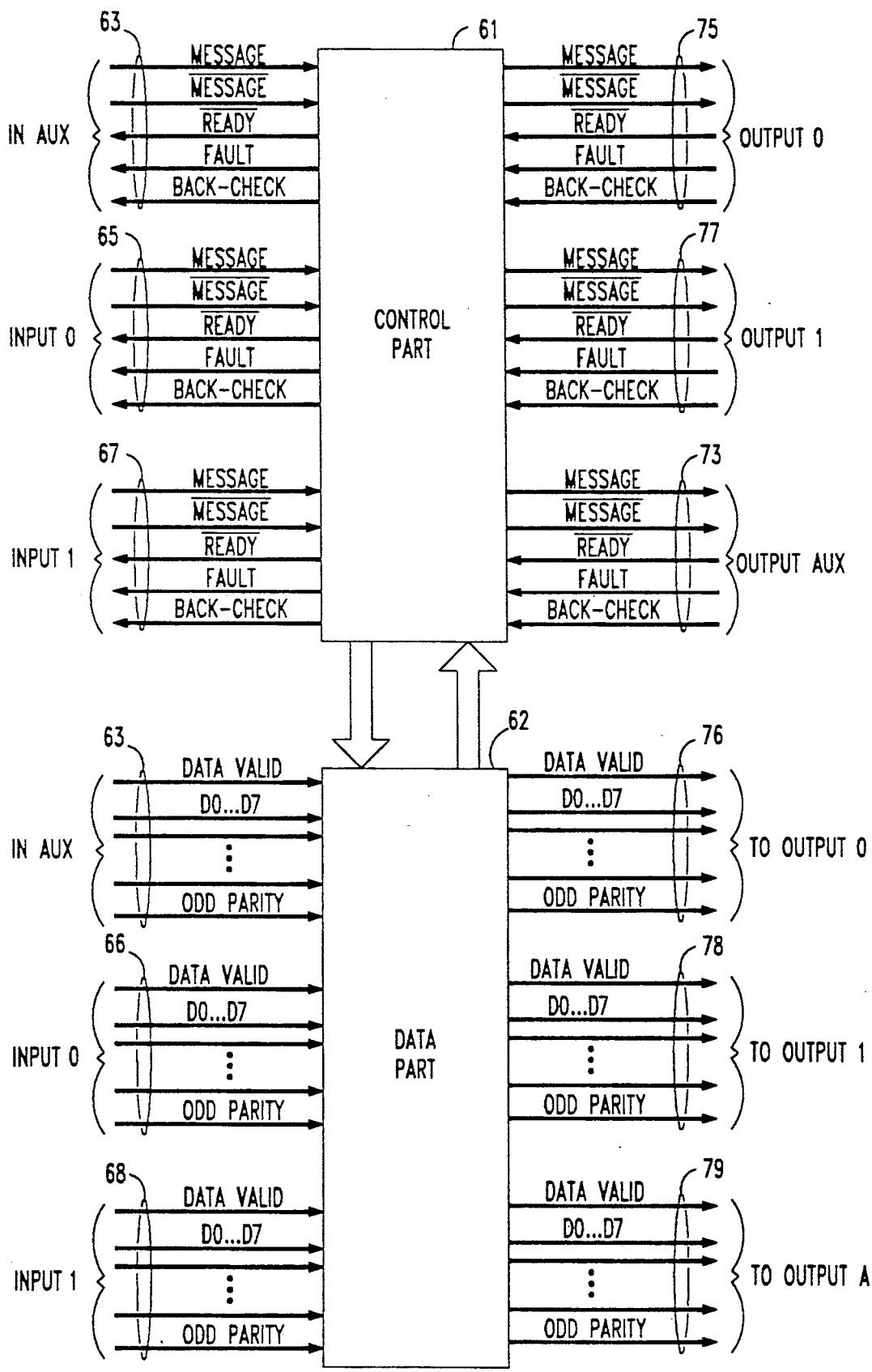
FIG. 2 depicts a general block diagram of a switch in a network such as the network of FIG. 1.

FIG. 2 presents the general block diagram of a switch to be used in arrangements such as depicted in FIG. 1; e.g., switch 10 of FIG. 1. For illustrative purposes, the following description of the FIG. 1 network and the switches used in the network assumes that the FIG. 1 network operates in a pocket switching mode.

Unlike the switch design in the aforementioned thesis, which comprises six separate modules, with each including a control portion and a data portion, the FIG. 2 switch comprises a single control portion 61 and a single data portion 62. Portion 61 generates the control signals for the protocol with adjoining switches and the control signals for the multiplexing in the data portion.

More specifically, control portion 61 includes a bus 63 that is connected to the alternate output port of some other switch. For example, bus 63 of switch 10 is connected to the alternate output port of switch 16 of FIG. 1. Bus 63 of switch 10 receives a MESSAGE and a $\overline{\text{MESSAGE}}$ signal (a signal in dual rail format, or complementary format, or dual rail code; this is to be distinguished from arrangements where data circuits and/or paths are duplicated and carry the same information) from switch 16 and sents a READY signal, a FAULT signal and a BACK-CHECK signal to switch 16.

Data portion 62 of switch 10 receives information from that same port of switch 16, but over bus 64. Bus 64 contains a VALID DATA signal line, a PARITY signal line, and 8 data lines. The parity sense employed is "odd". Odd parity is necessary for the TSC checkers to operate properly.

Control portion 61 also includes buses 65 and 67 which are connected to output ports of other switches in the immediately preceding stage of switches within the network of FIG. 1. In connection with switch 10, for example, bus 65 is connected to switch 50, whereas bus 67 is connected to switch 53. Data portion 62 also includes two additional buses that are connected to the two switches in the immediately preceding stage to which buses 65 and 67 are connected. These are buses 66 and 68, respectively.

The input interfaces of the control portion and the data portion have a parallel set of output interfaces. That is, control portion 61 includes buses 73, 75 and 77 that correspond to buses 63, 65, and 67. Similarly, data portion 62 includes buses 74, 76 and 78 that correspond to buses 64, 66, and 68.

In bus 63, the signals MESSAGE and $\overline{\text{MESSAGE}}$ indicate the presence of a packet. The signals $\overline{\text{READY}}$, FAULT and BACK-CHECK are coded in 1-out-of-3 code and carry the flow control and fault notification information. In bus 64, the PARITY line carries the odd parity bit that is computed over the 8 data bit-lines (D0-D7) and the DATA VALID line.

FIG. 3 presents the format of packets that are passed through the switch of this invention. The first byte of the packet, i.e., the collection of the 8 bits on bus 64 at the first clock period, contains the address of the output port of the network to which the packet is to be switched. This address is followed by the remainder of the header and any number of data bytes.

The protocol signals used, and their timing, are illustrated in FIG. 4. The beginning of the packet is marked by the MESSAGE line rising from logic "0" to logic "1", and the end of a packet is delimited by the MESSAGE line falling back to logic "0". When the DATA VALID signal is asserted (logic "1"), it indicates the presence of legitimate signals on data lines D0 ... D7. Conversely, when the DATA VALID signal is low, it is interpreted as an indication that the signals on the data lines are to be ignored. This situation might develop when the transmission rate of the source of the packet is slower than the transmission rate of the data buses in the switch. That is, since the switching network is synchronous, as depicted by the clock line 101 in FIG. 4, a synchronizing buffer must be included at the switching network's input. When the input data rate is slower than the rate of the switching network, "dead times" will occur when no new data is offered by the source. At such times the network input buffers will be empty and while the packet has not yet ended, there is no data to be transmitted. To inform the network of this state, the VALID DATA line goes "low". Thus, the MESSAGE lines and the DATA VALID line combine to handle the protocols for the slow source.

As the MESSAGE line on an input port of a switch is asserted and the packet address is captured in the first byte, control portion 61 determines the appropriate switch output port to which the packet should be routed. In the absence of a conflict, the control routes the received first byte to the appropriate switch output port and asserts the MESSAGE line on that switch output port (e.g. bus 75 of the source switch and bus 65 of the destination switch). When that switch output port is busy, the $\overline{\text{READY}}$ signal is sent back to the switch that submitted the packet (e.g. from bus 65 of the destination switch to bus 75 of the source switch). When the switch receives a $\overline{\text{READY}}$ signal on an output link during the transmission of a packet, it asserts its $\overline{\text{READY}}$ signal on the input link connected to that particular output link, and withholds further transmission. In other words, a switch that receives a $\overline{\text{READY}}$ signal on its bus 75 will reflect that $\overline{\text{READY}}$ signal to the input bus (63, 65 or 67) that is connected to bus 75. When the $\overline{\text{READY}}$ signal on the output link goes down, the switch drops the $\overline{\text{READY}}$ signal on its input link and resumes transmission. This is how the flow control is implemented for the fast source.

If the FAULT signal line that is fed to an output port of a switch from a subsequent switch goes high during the transmission of a packet, such as the FAULT line on bus 75, (not shown in FIG. 4) then the MESSAGE line on that output link is set to low by the switch that receives that FAULT indication (i.e. also on bus 75), and the remainder of the packet is lost. This FAULT signal stays high until it is manually reset following a repair of the faulty switch. While the FAULT line is high, the MESSAGE line cannot be raised at that switch port, and no packets can be routed to that switch port by control 61 of that switch. The purpose of setting the MESSAGE line to low value, which in effect says to the succeeding switch that the packet ended and there is no more data, is that there is no assurance as to what action, if any, is being taken by the faulty switch. If the faulty switch, in fact, continues to send data to some destination, that data would be corrupted. Sending the MESSAGE low signal terminates such transmission and has the additional benefit that the number of bytes received by that destination will not correspond to the expected number of bytes. That, in turn, would cause the destination to drop the entire packet that experienced a fault, which is a desirable result.

BACK-CHECK signal, generated in FAULT signal generator 97, is a redundant bit that, together with FAULT and $\overline{\text{READY}}$ signals, forms a 1-out-of-3 code. That is, of the three signals, exactly one takes the logic value "1", and the rest are "0", under fault-free operation. The interpretation of these signals is as follows.

| FAULT | READY | BACK-CHECK | |
|---|---|---|---|
| 1 | 0 | 0 | The switch is faulty. |
| 0 | 1 | 0 | The switch is ok, unable to receive data. |
| 0 | 0 | 1 | The switch is ok. |

Figure 5:
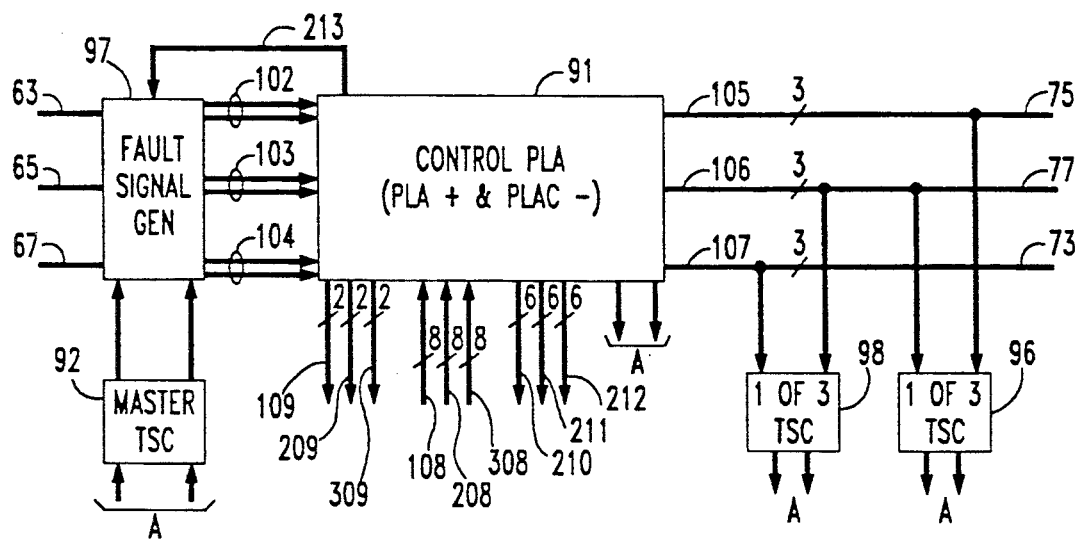
FIGS. 5 and 5A together show a more detailed block diagram of the FIG. 2 switch, including the individual multiplexers, registers, TSC Checkers, and control.
Figure 5A:
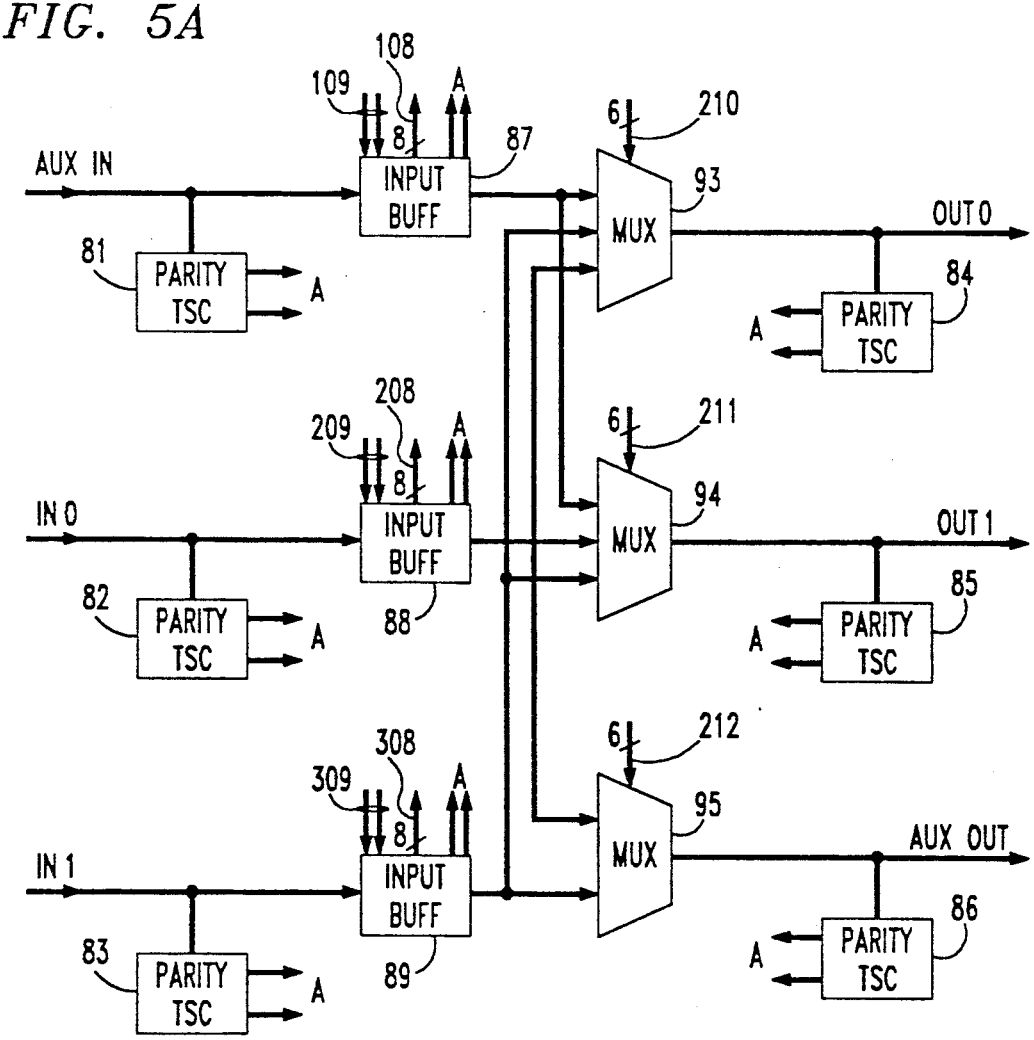

FIG. 5 provides a detailed block diagram of the switch architecture. Control portion 61 comprises control PLA 91, 1-out-of-3 code TSC checkers 96 and 98, master TSC checker 92, and FAULT signal generator circuit 97. Data portion 62 comprises input parity TSC checker 81, 82 and 83; output parity TSC checkers 84, 85, and 86; input buffers 87, 88, and 89; and multiplexers 93, 94, and 95.

PLA 91 carries out the control logic of the switch. It is implemented in two complementary PLAs (PLA+ and PLA−). The two control PLAs receive the same inputs and generate outputs which are mutually complementary. The inputs are the input MESSAGE message buses 102, 103, and 104 of buses 63, 65 and 67, respectively; the incoming $\overline{\text{READY}}$, FAULT and BACK-CHECK buses 105, 106, and 107 of buses 75, 77, and 73, respectively, and the routing information on buses 108 208 and 308 from registers 87, 88 and 89, respectively. The outputs are sent, in dual rail form to buffers 87 (bus 109), 88 (bus 208), and 89 (bus 308), to multiplexers 93, 94 and 95, (buses 210, 211 and 212, respectively) and to faulty signal generator 97 (bus 213). Line 109, for example, enables register 87 to accept new data. Each of the control output pairs of PLA 91 is also sent to master TSC checker 92, to make sure that each pair is indeed carrying a dual rail signal. Master TSC checker 92 receives additional inputs and performs other checks, as explained below.

The 1-out-of-3 code TSC checker 96 is responsive to the $\overline{\text{READY}}$, FAULT, and BACK-CHECK lines on buses 73, 75, and 77. More specifically, TSC checker 96 is responsive to the $\overline{\text{READY}}$, FAULT and BACK-CHECK signals on buses 75 and 77 and TSC checker 98 is responsive to the $\overline{\text{READY}}$, FAULT and BACK-CHECK signals on buses 77 and 73. Checkers 96 and 98 can be constructed in the manner described by Golan in "Design of totally self checking checker for 1-out-of-3 code," IEEE Transactions on Computers, Mar. 1984, pp. 998-999. The two output pairs of TSC Checker 96 are applied to master TSC checker 92.

Master checker 92 can be constructed as described, for example, in "Totally Self-Checking Circuits for Separate Codes," a PhD dissertation by M. J. Ashjaee, University of Iowa, Jul. 1976; specifically FIG. 1.8.

Controller 91 is shown in FIG. 5 to be a PLA. Of course, this is merely illustrative and any other method for developing the combinational logic necessary of controller 91 would suffice. In designing the function of the controller, one can easily separate the logic into two blocks: one that handles the protocol, such as flow control, and one that handles the actual switching (and alternate routing). The actual Boolean logic that needs to be carried out by controller 91 is strictly related to the network in which the switch of FIG. 5 is inserted. This is perfectly conventional.

In data portion 62, input bus 64 is applied to input buffer 87 and to TSC parity checker 81. Likewise, bus 66 is applied to input buffer 88 and to TSC parity checker 82, and bus 68 is applied to input buffer 89 and to TSC parity checker 83. The input TSC checkers are odd parity checkers. Their construction is conventional, as described for example by Carter and Schneider in "Design of Dynamically Checked Computers," IFIP68, Vol 2, Edinburgh, Scotland, pp. 878-883, Aug. 1968. They send their outputs, in dual rail logic, to master TSC checker 92.

Input buffers 87-89 must have at least one "mainline" byte of memory and one spare byte of memory. One can have a larger number of memory bytes, and the larger number will improve performance of the switching network, as will be appreciated from the following description.

When a switch in some stage is blocked, the information that tells the system not to continue sending bytes of data ($\overline{\text{READY}}$) is propagated back. In the mean time, data has entered the switch. If that data is not to be lost, it must be buffered. All the links that participate in the connection of an input of the network to the blocked switch are also blocked. Although the alternate routing capability of the FIG. 1 network ameliorates this problem, reducing the number of held links is beneficial. Increasing the memory size of the input buffers does exactly that. That is, when a larger buffer space is available at each input link, then each blocked switch would assert the $\overline{\text{READY}}$ signal to the preceding switch only when its buffer fills up. This quickly reduces the number of links that will be made busy by the back propagating $\overline{\text{READY}}$ signal.

The reason for the need of at least one byte of memory and of a spare byte of memory stems from the fact that there is a one-byte delay in moving the data forward, and an additional byte delay in communicating the $\overline{\text{READY}}$ condition back to the source. This is illustrated in FIG. 6.

Figures 6, 6A:
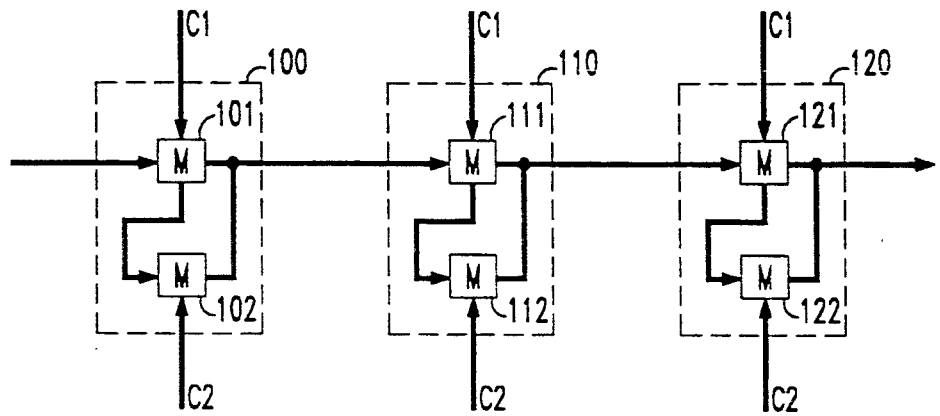
FIGS. 6 and 6A present an operational sequence of the buffers within each of the switches in the FIG. 1 network.

FIG. 6 presents a sequence of signals that may occur in the switches of the FIG. 1 network. Block 100 represents the input buffer of a switch in stage 1, block 110 represents the input buffer of a switch in stage 2, and block 120 represents the input buffer of a switch in stage 3. This may be, for example, buffer 87 of FIG. 5. For simplicity, the multiplexers are not shown. Blocks 100, 110, and 120 can, of course, be constructed in an identical manner. Block 100 contains a one byte register 101 into which the incoming bytes are stored. Under control of signal C1, the output of register 101 is applied to the output of block 100 through one output, or to the input of register 102 through another output. Under control of signal C2, register 102 applies its contents to the output of block 100. The outputs of registers 101 and 102 are shown in FIG. 6 to be "collector ORed". It is assumed that registers 101 and 102 are of the type that can be placed in a neutral state. When using registers that cannot be placed in a neutral state, an additional multiplexer needs to be included to combine the outputs of registers 101 and 102, as appropriate.

At time t1, in accordance with FIG. 6, register 121 contains byte B0, register 111 contains byte B1, and register 101 contains byte B2. Registers 122, 111, and 102 are empty. If and when, at time t2, transmission is blocked from block 120 (for example, when the $\overline{\text{READY}}$ line goes high), byte B0 is transferred to register 122, byte B1 advances to register 121, byte B2 advances to register 111, and byte B3 is inserted into register 101. If transmission is still blocked, at time t3 byte B2 is transferred to register 111, byte B3 advances to register 111, and byte B4 is inserted into register 101. If, for example, transmission resumes at time t4, then the contents of register 122 is transmitted to the output of block 120. The contents of register 121 is left unchanged. Concurrently, the contents of register 101 is moved to register 102 while byte B5 is inserted into register 101. Byte B5 is inserted into register 101 and byte B4 is transferred to register 102 because the $\overline{\text{READY}}$ signal has not yet reached the source. At time t5, the $\overline{\text{READY}}$ signal prevents further insertion of bytes by the source. Register 121 accepts byte B2 from block 110, register 111 maintains byte B3, register 102 maintains byte B4, and register 101 maintains byte B5. Registers 122 and 112 are empty. At time t6, register 121 receives byte B3 from register 111, register 111 receives byte B4 from register 102, and register 101 maintains byte B5. Registers 122, 112 and 102 are empty. Finally, transmission by the source is enabled again and, at time t7, register 121 contains byte B4, register 111 contains byte B5, register 101 contains byte B6, and registers 122, 112 and 102 are empty.

The outputs of input buffers 87-89 are fed to multiplexers 93-95. More specifically, buffer 87 (the alternate input of the switch) applies its signals to multiplexers 93 and 94, while buffers 88 and 89 apply their signals to all three of the multiplexers (93, 94 and 95). Multiplexer 93 outputs its signals to bus 76 and to output TSC parity checker 84, multiplexer 94 outputs its signals to bus 78 and to output TSC parity checker 85, and multiplexer 95 outputs its signals to bus 74 and to output TSC parity checker 86.

All of the TSC parity checker outputs (81-86), the MESSAGE and $\overline{\text{MESSAGE}}$ signals, and the outputs of the control PLA are fed to master TSC checker 92. Checker 92 combines the outputs of the checkers and makes sure that the checkers themselves are operational (i.e., they develop dual rail outputs). In this manner, an error flagged by any one of the TSC Checkers ultimately results in an error indication at the master TSC checker 92. The error indication from the master TSC checker 92 is applied to FAULT generator circuit 97. Generator 97 combines this information with the $\overline{\text{READY}}$ information to form the FAULT line signals that are sent to the predecessor switches. Specifically, generator 97 can simply be one Exclusive OR gate to which the Master TSC checker outputs are connected, and the output of the Exclusive OR gate forms the FAULT line. The FAULT line of the first Exclusive OR gate can then be combined with the $\overline{\text{READY}}$ line in a second Exclusive OR gate and the output of the second Exclusive OR gate forms the BACK-CHECK line. The output $\overline{\text{READY}}$ line of generator 97 can be the same as the input $\overline{\text{READY}}$ line of generator 97.

The inclusion of the output TSC checkers facilitates a precise determination of the source of an error. If a data error is caused within the data paths in a switch, the output checkers within the switch will cause an error indication to be generated within that switch. In the absence of the output checkers, the errors would still be detected in the next switch, but these errors could be incorrectly attributed to the switch where they are detected.

Figure 7:
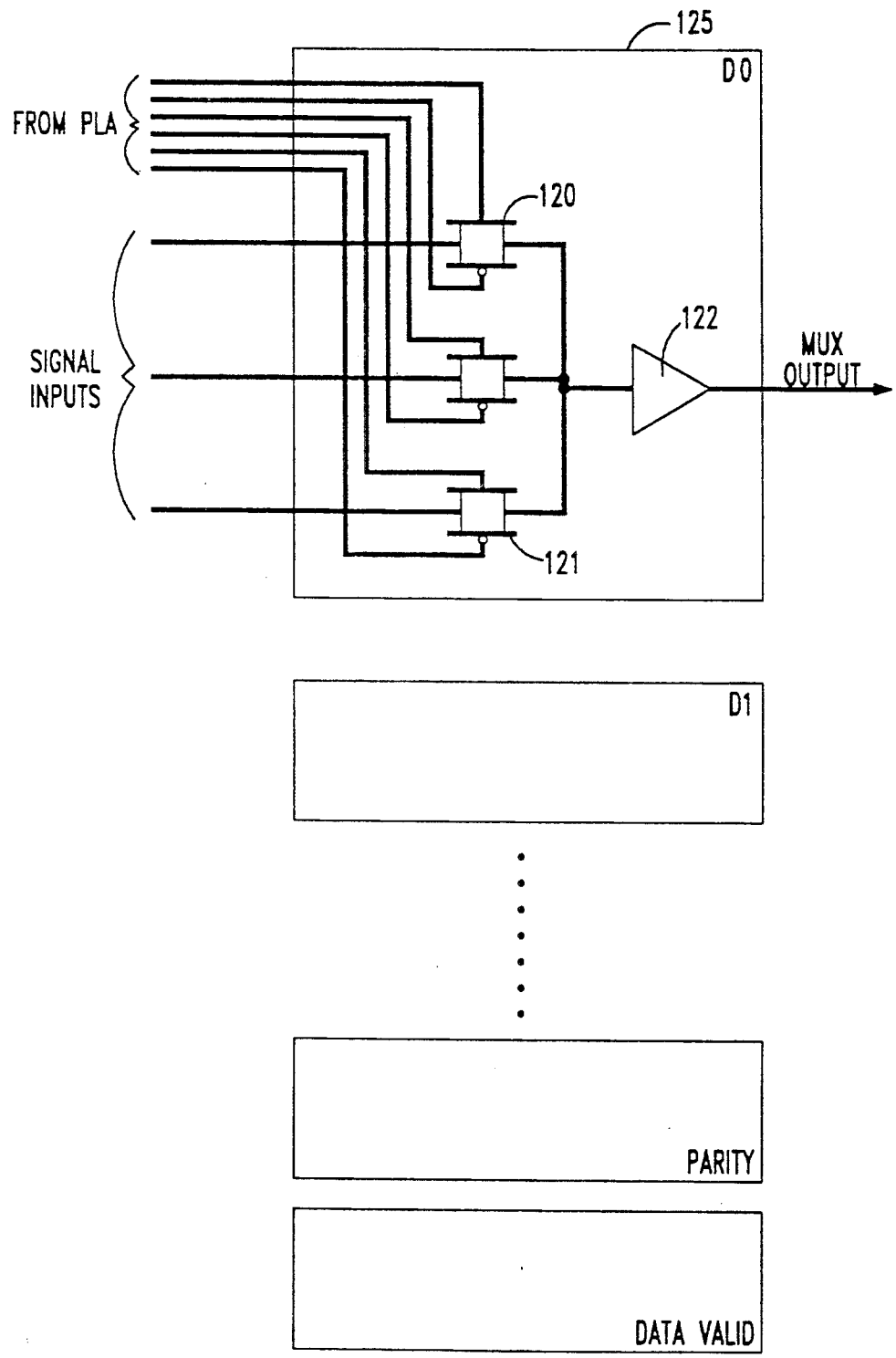
FIG. 7 gives the detailed circuit diagram of one bit within one multiplexer of the FIG. 4 switch embodiment.

FIG. 7 presents a schematic diagram of one of the multiplexers in the FIG. 5 switch. It comprises ten blocks 125 that operate in unison under control of three pairs of signals from controller 91: eight blocks for the data, one block for the parity, and one block for the DATA VALID line. Within block 125, a 1-out-of-3 selection is realized with three pass-thru branches that are connected to the input of a buffer amplifier 122. Each pass-thru branch comprises a pair of complementary MOS transistors (121 and 122) the are interconnected in parallel (sources and drains connected) and each of the transistors is controlled by complementary signals. In this manner, under normal operation, either both transistors are in on, or both transistors are off. Any single fault in the pass transistors would cause a data error that can be detected by the parity checkers. Any single error in the control signals would cause all the bits of the multiplexer output to become zero, which is also detectable by the odd output parity checkers.

We claim:

1. A multi-stage switching network with switches in each stage connected to switches in another stage, where at least one of said switches comprises:
    a switching module for routing signals applied to an input port of said switch to an output port of said switch,
    an output protocol port associated with said output port of said switch and an input protocol port associated with said input port of said switch, and
    a control module for generating dual rail internal control signals and for controlling said switching module through dual rail signal lines carrying said internal control signals.

2. The switching network of claim 1 wherein said control module further controls interactions of said switch with other switches connected to the switch through external control lines comprising dual rail signal lines, which external control lines are coupled to said input protocol port and said output protocol port.

3. The switching network of claim 1 wherein said control module further controls interactions of said switch with other switches connected to the switch through external control lines comprising dual rail signal lines and m-out-of-n signal line groups, which external control lines are coupled to said input protocol port and said output protocol port.

4. The switching network of claim 3 wherein said control module further comprises:
    means for receiving indication from said output protocol port that a switch connected to said output port is occupied and for communicating that indication through said input protocol port to a switch connected to said input port, and
    means for receiving information from said input protocol port and said input port that a switch connected to said input port is in the midst of sending a packet of data but has no data available for transmission and for communicating that information through said output protocol port and said output port.

5. The switching network of claim 1 wherein said switching module includes a parity checker at said input port of said switch and at said output port of said switch, and means for communicating error indications developed by said parity checkers to said control module.

6. The switching network of claim 5 wherein said parity checkers develop said error indications in dual rail form.

7. The switching network of claim 5 wherein said control module includes means for combining the error indications of said parity checkers and for modifying said interactions of said switch with other switches in response thereto.

8. The switching network of claim 5 wherein said parity checkers are totally-self-checking parity checkers.

9. The switching network of claim 5 wherein said control module generates a fault signal corresponding to said error indications and sends the fault signal to one of said protocol ports.

10. The switching network of claim 1 wherein said switching module comprises:
    a buffer module connected to said input port and a signal routing module interposed between said buffer module and said output port.

11. The switching network of claim 1 wherein said switching module comprises at least two branches, each of which having an input line and an output line, with the input line responsive to an input signal and the output line connected to a selection means, and two complementary switches, connected in parallel and interposed between said input line and said output line, under control of a dual rail internal control signal pair from said control module, with one signal of said pair controlling one of said switches and the other signal of said pair controlling the other of said switches.

12. A switch having at least two signal input ports and at least two signal output ports, for routing signals applied to said signal input ports to said signal output ports comprising:

an input protocol port for interfacing said switch with sources that apply signals to said input signal ports, and an output protocol port for interfacing said switch with destinations to which output signals of said output signal ports are delivered;

a switching module for routing signals applied to said signal input ports to said signal output ports, and a control module for generating dual rail signals and for controlling said switching module through said dual rail signal lines and for controlling interactions of said switch with said sources and said destinations through dual rail signal lines.

13. The switch of claim 12 wherein said control module further controls interactions of said switch with other switches connected to the switch in response to dual rail control signals received through said input protocol port and said output protocol port.

14. The switch of claim 12 wherein said control module further controls interactions of said switch with other switches connected to the switch in response to external control signals comprising dual rail control signals and m-out-of-n signal groups, which external control signals are received through said input protocol port and said input protocol port.

15. The switch of claim 14 wherein said control module further comprises:

means for receiving indication from said output protocol port that a switch connected to one of said signal output ports is occupied and for communicating that indication through said input protocol port to a switch connected to one of said signal input ports, and means for receiving information from said input protocol port and said signal input port that a switch connected to said signal input port is in the midst of sending a packet of data but has no data available for transmission and for communicating that information through said output protocol port and said signal output port.

16. The switch of claim 12 wherein said routing module includes a parity checker at each signal input port of said switch and at each signal output port of said switch, and means for communicating error indications developed by said parity checkers to said control module.

17. The switch of claim 16 wherein said parity checkers develop said error indications in dual rail form.

18. The switch of claim 16 wherein said control module includes means for combining the error indications of said parity checkers and for modifying said interactions of said switch with other switches in response thereto.

19. The switch of claim 16 wherein said parity checkers are totally-self-checking parity checkers.

20. The switch of claim 12 wherein said switching module comprises:

a buffer module connected to said signal input ports and a signal routing module interposed between said buffer module and said signal output ports, wherein said buffer module comprises:

a first buffer stage for storing information received by said switch at said signal input ports, a second buffer stage for storing information received from said first buffer stage, and means for selecting the information stored in one of said buffer stages for delivery by said switching module.

21. The switch of claim 12 wherein said switching module comprises at least two branches, each of which having an input line and an output line, with the input line responsive to an input signal and the output line connected to a selecting means, and two complementary switches, connected in parallel and interposed between said input line and said output line, under control of a dual rail signal pair from said control module, with one signal of said pair controlling one of said switches and the other signal of said pair controlling the other of said switches.

* * * * *